(12) United States Patent
Weilach et al.

(10) Patent No.: US 10,316,467 B2
(45) Date of Patent: Jun. 11, 2019

(54) PROCESS FOR PRETREATING RECLAIMED COTTON FIBERS TO BE USED IN THE PRODUCTION OF MOLDED BODIES FROM REGENERATED CELLULOSE

(71) Applicant: LENZING AG, Lenzing (AT)

(72) Inventors: Christian Weilach, Vöcklabruck (AT); Susanne Möderl, St. Georgen im Attergau (AT); Christian Sperger, Schörfling (AT); Andrea Borgards, Steinbach am Attersee (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 24 days.

(21) Appl. No.: 15/027,945

(22) PCT Filed: Nov. 18, 2014

(86) PCT No.: PCT/AT2014/000205
§ 371 (c)(1),
(2) Date: Apr. 7, 2016

(87) PCT Pub. No.: WO2015/077807
PCT Pub. Date: Jun. 4, 2015

(65) Prior Publication Data
US 2016/0237619 A1   Aug. 18, 2016
US 2017/0284023 A9   Oct. 5, 2017

(30) Foreign Application Priority Data
Nov. 26, 2013 (AT) .................................. A 905/2013

(51) Int. Cl.
*D21C 9/16*   (2006.01)
*D21C 9/00*   (2006.01)
(Continued)

(52) U.S. Cl.
CPC .............. *D21C 9/153* (2013.01); *C08B 16/00* (2013.01); *D01F 2/00* (2013.01); *D01F 2/06* (2013.01);
(Continued)

(58) Field of Classification Search
CPC .......... D21C 9/00; D21C 9/163; D21C 9/153; D21C 9/1042; D21C 9/16; D01F 2/00;
(Continued)

(56) References Cited

U.S. PATENT DOCUMENTS 2,184,586 A   12/1939   Donagemma
2,647,891 A   8/1953   Warburton
(Continued)

FOREIGN PATENT DOCUMENTS

AT   287 905 B   2/1971
AT   401 779 B   11/1996
(Continued)

OTHER PUBLICATIONS

Machine Translation of CN 102677230 A, Published on Sep. 19, 2012.*
(Continued)

*Primary Examiner* — Jose A Fortuna
(74) *Attorney, Agent, or Firm* — Venable LLP

(57) ABSTRACT

A process for pretreating reclaimed cotton fibers to be used in the production of molded bodies from regenerated cellulose, characterized by effective metal reduction and adjustment of the degree of polymerization and brightness, including a metal removing stage and an oxidative bleaching stage of the reclaimed cotton fibers or pulp produced thereof. Reclaimed cotton fibers treated according to the described process may be used alone or in blends with conventional dissolving pulp as raw material for the production of molded bodies from regenerated cellulose. The process enables (Continued)

technically smooth, safe, and economically feasible spinning via the Viscose or Lyocell process, therefore, the current invention provides an efficient recycling pathway for cotton waste materials.

26 Claims, 1 Drawing Sheet

(51) Int. Cl.
| | |
|---|---|
| *D21C 9/153* | (2006.01) |
| *D01F 2/00* | (2006.01) |
| *D01F 2/06* | (2006.01) |
| *D01F 2/08* | (2006.01) |
| *C08B 16/00* | (2006.01) |
| *D01G 11/00* | (2006.01) |

(52) U.S. Cl.
CPC ............... *D01F 2/08* (2013.01); *D01G 11/00* (2013.01); *D21C 9/00* (2013.01); *D21C 9/163* (2013.01); *D10B 2201/02* (2013.01); *Y02W 30/66* (2015.05)

(58) Field of Classification Search
CPC ... D01F 2/06; D01F 2/08; C08B 16/00; C08B 9/00; D01G 11/00; Y10T 428/2965; D21H 13/08
See application file for complete search history.

(56) References Cited

U.S. PATENT DOCUMENTS

| | | | |
|---|---|---|---|
| 3,758,457 A | 9/1973 | Broeck, Jr. et al. | |
| 3,817,983 A | 6/1974 | TenBoreck, Jr. et al. | |
| 3,914,130 A | 10/1975 | Newcomer | |
| 4,145,533 A | 3/1979 | Farrall | |
| 5,024,831 A | 6/1991 | Kurisaki et al. | |
| 5,064,950 A | 11/1991 | Okuma et al. | |
| 5,227,022 A | 7/1993 | Leonhardt et al. | |
| 5,331,801 A | 7/1994 | Heifetz | |
| 5,369,861 A | 12/1994 | Ball et al. | |
| 5,447,603 A * | 9/1995 | Michalowski | D21C 9/002 162/181.4 |
| 5,481,864 A | 1/1996 | Wright | |
| 5,589,125 A | 12/1996 | Likeli et al. | |
| 5,601,767 A | 2/1997 | Firgo et al. | |
| 5,609,676 A | 3/1997 | von der Eltz | |
| 5,795,488 A | 8/1998 | Kalt et al. | |
| 6,010,594 A | 1/2000 | Henricson et al. | |
| 6,093,355 A | 7/2000 | Newbury et al. | |
| 6,183,865 B1 * | 2/2001 | Yabuki | D01F 2/00 428/364 |
| 6,527,987 B1 * | 3/2003 | Yabuki | D01F 2/00 264/177.13 |
| 6,833,187 B2 | 12/2004 | Luo et al. | |
| 9,133,570 B2 | 9/2015 | Lightman | |
| 9,163,095 B2 | 10/2015 | Innerlohinger et al. | |
| 2001/0050153 A1 | 12/2001 | Wajer et al. | |
| 2002/0037407 A1 * | 3/2002 | Luo | D01D 5/14 428/364 |
| 2002/0081428 A1 * | 6/2002 | Luo | D01D 1/02 428/364 |
| 2002/0124366 A1 * | 9/2002 | Hirsch | D04H 1/4274 28/103 |
| 2004/0131690 A1 | 7/2004 | Lynch | |
| 2006/0144534 A1 * | 7/2006 | Paren | D21C 9/1042 162/76 |
| 2007/0249774 A1 * | 10/2007 | Guzauskas | C08F 265/06 524/494 |
| 2008/0003429 A1 | 1/2008 | Luo et al. | |
| 2010/0139875 A1 * | 6/2010 | Paren | D06M 15/263 162/5 |
| 2010/0209708 A1 | 8/2010 | Braun et al. | |
| 2010/0297445 A1 | 11/2010 | Guentherberg et al. | |
| 2014/0041821 A1 * | 2/2014 | Graveson | D01D 1/02 162/157.6 |
| 2014/0182801 A1 * | 7/2014 | Hawkins | D21C 3/02 162/181.4 |
| 2015/0136346 A1 * | 5/2015 | Bogren | C08B 9/00 162/41 |
| 2015/0291762 A1 * | 10/2015 | Watanabe | A61F 13/15707 428/401 |
| 2016/0237619 A1 * | 8/2016 | Weilach | D01F 2/00 |
| 2016/0326671 A1 * | 11/2016 | Schrempf | D01F 2/00 |
| 2016/0369456 A1 * | 12/2016 | Flynn | D21H 17/74 |
| 2018/0002836 A1 * | 1/2018 | Sperger | C08B 16/00 |

FOREIGN PATENT DOCUMENTS

| | | | | |
|---|---|---|---|---|
| AT | 515152 A1 * | 6/2015 | | D01F 2/00 |
| CN | 102199310 A | 9/2011 | | |
| CN | 102660791 A | 9/2012 | | |
| CN | 102677230 A | 9/2012 | | |
| DE | 2321829 | 4/1973 | | |
| DE | 4118899 C1 | 6/1991 | | |
| EP | 0 356 419 B1 | 12/1992 | | |
| EP | 0 584 318 B1 | 5/1996 | | |
| EP | 0 781 356 B1 | 7/1998 | | |
| EP | 0 717 131 B1 | 11/1998 | | |
| EP | 0 671 492 B1 | 9/1999 | | |
| EP | 1873302 A2 | 1/2008 | | |
| EP | 2 589 689 A2 | 5/2013 | | |
| GB | 685843 A | 1/1953 | | |
| JP | 08239504 A * | 9/1996 | | C08B 9/00 |
| WO | 01/04075 A1 | 1/2001 | | |
| WO | 02/057319 A2 | 7/2002 | | |
| WO | 2004/043329 A2 | 5/2004 | | |
| WO | 2007/070904 A1 | 6/2007 | | |
| WO | 2009/036480 A1 | 3/2009 | | |
| WO | 2009/037146 A1 | 3/2009 | | |
| WO | 2009/065891 A1 | 5/2009 | | |
| WO | WO 2010071910 A2 * | 7/2010 | | D02G 3/04 |
| WO | 2011/077446 A1 | 6/2011 | | |
| WO | 2011/130276 A2 | 10/2011 | | |
| WO | 2013/006876 A1 | 1/2013 | | |
| WO | WO 2015077807 A1 * | 6/2015 | | D01F 2/00 |

OTHER PUBLICATIONS

Zhang et al., "Structure and Properties of Regenerated Cellulose Films Prepared from Cotton Linters in NaOH/Urea Aqueous Solution," 2001, Ind. Eng. Che. Res., 40, pp. 5923-5928.*
Röder et al., "Comparative Characterisation of Man-Made Regenerated Cellulose Fibres," 2009, Lenzinger Berichte, 87, pp. 98-105.*
Björquyist et al., "Textile qualities of regenerated cellulose fibers from cotton waste pulp," 2017, Textile treasearch Journal, pp. 1-8.*
M. Abu-Rous et al., "Visualisation of the Nano-Structure of Tencel® (Lyocell) and Other Cellulosic as an Approach to Explaining Functional and Wellness Properties in Textiles", Lenzinger Berichte 85 (2006), pp. 31-37.
Gericke et al., "Functional Cellulose Beads: Preparation, Characterization, and Applications", Chemical Reviews, 113, (2013) pp. 4812-4836.
Trygg et al., "Physicochemical Design of the Morphology and Ultrastructure of Cellulose Beads", vol. 93, Issue 1, (2013) pp. 294-299.
M. Opietnik et al., "Tencel® Gel—A Novel Cellulose Micro Suspension", Lenzinger Berichte 91 (2013), pp. 89-92.
L. Youhanan, "Enviommental Assessment of Textile Material Recovery Technique: Examining Textile Flow in Sweden", (2013) p. 18-19.
International Search Report for PCT/AT2014/000202 dated May 12, 2015.
International Search Report for PCT/AT2014/000203 dated May 21, 2015.
International Search Report for PCT/AT2014/000205 dated Mar. 10, 2015.

(56) References Cited

OTHER PUBLICATIONS

Pending U.S. Appl. No. 15/027,923, filed Apr. 7, 2016 (drawings attached).
Pending U.S. Appl. No. 15/027,937, filed Apr. 7, 2016 (drawings attached).
https://en.wikipedia.org/wiki/Dissolving_pulp.
G. Uçar, et al., "Accurate determination of the limiting viscosity number of pulps," Wood Sci. Technol., 38, pp. 139-148 (2004).
K. Götze, "Chemiefasem nach dem Viskoseverfahren," Staple Fibers, 3rd Edition, vol. 1, pp. 670-672 (1967).

* cited by examiner

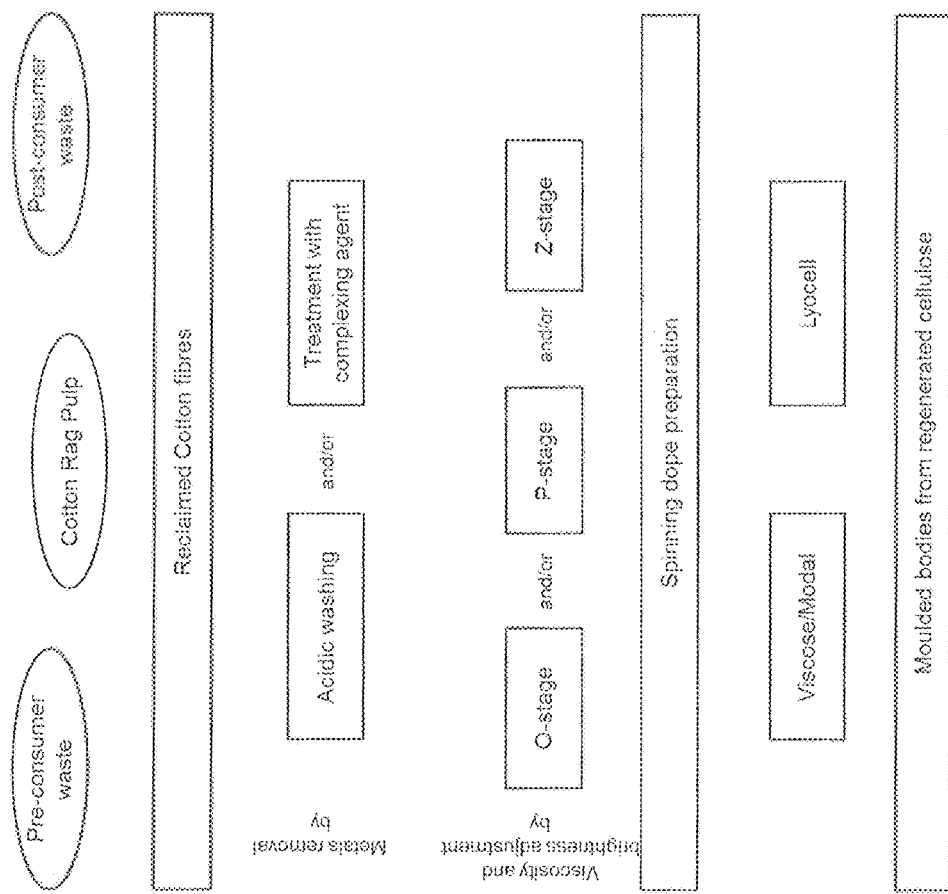

PROCESS FOR PRETREATING RECLAIMED COTTON FIBERS TO BE USED IN THE PRODUCTION OF MOLDED BODIES FROM REGENERATED CELLULOSE

BACKGROUND OF THE INVENTION

Field of the Invention

A process for pretreating reclaimed cotton fibers to be used in the production of molded bodies from regenerated cellulose, characterized by effective metal reduction and adjustment of the degree of polymerization and brightness, including a metal removing stage and an oxidative bleaching stage of the reclaimed cotton fibers or pulp produced thereof. Reclaimed cotton fibers treated according to the described process may be used alone or in blends with conventional dissolving pulp as raw material for the production of molded bodies from regenerated cellulose.

The process enables technically smooth, safe, and economically feasible spinning via the Viscose or Lyocell process, therefore the current invention provides an efficient recycling pathway for cotton waste materials.

The products thus obtained are high quality regenerated cellulosic molded bodies from recycled cotton waste, suitable for textile and nonwoven manufacturing.

State of the Art

According to the International Cotton Advisory Committee 26.39 million tons of cotton were produced in 2012/13 worldwide. About 95% of the annual cotton production is used in the production of yarns, which are subsequently used in the manufacturing of textile products. Cotton textiles approximately account for one third of the global textile production. However, already along the textile manufacturing process, significant amounts of cotton waste material are generated, for example spinning waste or cuttings from confectioning. This kind of waste is typically referred to as "pre-consumer waste", sometimes it is also known as "post-industrial waste". Of course, cotton waste is also generated once a cotton containing fabric is discarded by the user, i.e. "post-consumer waste".

Nowadays, the main fraction of the described cotton waste materials predominantly ends up in incineration and landfill, which equals an inevitable loss of valuable cellulose raw material.

Only minor amounts of textile cotton waste are currently recycled. Existing pathways for cotton recycling include for example the donation of post-consumer cotton textiles to charity organizations or the production of wipes or shoddy fibers for insulation materials from post-consumer cuttings. However, except from reselling in second-hand shops or distribution in developing countries, the recycling methods typically represent a down-cycling of the cotton waste material, i.e. a product being produced from recycled cotton waste material is generally less valuable than the initial product.

Direct reuse of cotton waste materials in the production of new textiles is rather limited. One of the main problems in direct recycling is the typically shorter length of reclaimed cotton fibers from cotton waste material, which may additionally be corrupted due to mechanical fiber damage during the recovery process. Therefore reclaimed cotton fibers usually need to be blended with virgin fibers for the production of high quality yarns and textiles. However, if reclaimed fibers from cotton waste material are blended with virgin fibers to produce a suitable raw material for textile manufacturing, the reclaimed material should originate from rather early stages of the textile chain. If, for example, cotton waste material would be recovered after dyeing of a fabric, a raw material produced by blending such colored fibers with virgin fibers may only be used for the production of fabrics of color similar to the reclaimed fibers. Considering cuttings from confectioning, which represent a high percentage of overall cotton waste materials, these would not be suitable for direct recycling as they incur in numerous qualities and colors but in typically low quantities.

U.S. Pat. No. 5,331,801 describes the production of recycled yarns from textile waste, however, the yarns made from recycled fibers require more twists to obtain the same strength properties when compared to yarns prepared from virgin fibers. The production of finer yarns suitable for the apparel and related textile industries requires blending with up to 90% of virgin fibers.

Similarly, U.S. Pat. No. 5,481,864 describes the production of recycled fabrics from cloth scraps. Cloth scraps are initially garneted at a moisture level of 10%, opened and blended with 10 to 25% of expensive premium carrier virgin fibers, such as e.g. cashmere.

Patent application WO2011/130276 A2 describes the use of blends of fibers recovered from pre-consumer cotton waste materials. The patent application describes a purely mechanical process and includes elaborate sorting efforts. It is mentioned that textile products made from such recovered materials comprise yarns that contain at least three different qualities of recovered cotton material. It is mentioned that yarns made from such recovered materials need to be spun with a twist multiple 15 to 30% higher than yarns to be used in the same end product made from virgin cotton fibers.

Patent application U.S. Pat. No. 5,369,861 A describes direct recycling or pre- or post-consumer waste.

Patent application WO 2011/077446 A1 describes another way of mechanically recycling cotton fabrics, by preparing sheets of cotton paper, cutting these sheets into stripes between and 0.1 to 2 mm and then weaving or knitting these stripes into a fabric.

All of the direct recycling processes mentioned above are purely mechanical, i.e. none of the processes includes any chemical steps neither for recovering the cotton waste material nor for pretreating the cotton waste material to make it recoverable.

Another way of recycling cotton waste materials is the production of cotton rag pulp (CRP). CRP has long been an important source of cellulosic material in paper production, especially in the early decades of the $20^{th}$ century. Therefore the general production process of CRP based on alkaline cooking of rags is well known. Later on, CRP became less important due to the facts that a) the upcoming blending of cotton with synthetic fibers was complicating CRP production and b) recycling of waste paper was developed for paper making. One advantage of transforming rags to pulp is that small amounts of different qualities or colors may be processed to result in large amounts of a uniform material. Yet, a disadvantage of CRP is that it may not be directly used as raw material for textile manufacturing, as the cellulose fibers degrade during the CRP production process, resulting in a reduced chain length of the cellulose molecules (i.e. lowered degree of polymerization ("DP")). The direct application of CRP in textile manufacturing is typically also limited due to low brightness as a result of mixing raw materials of different quality and color.

Rags suitable for the production of cotton rag pulp may originate from both pre- and post-consumer waste. According to the authors' knowledge, the use of cotton rag pulp for the production of regenerated cellulosic materials has not been reported yet.

Processes for the production of regenerated cellulosic materials are already known to the expert: The Lyocell process, in particular using aqueous amine oxide, especially preferred 4-methylmopholine N-oxide (NMMO) (see e.g., EP 0356419 B1 and EP 0584318 B1), the viscose process (see e.g. Götze, Chemiefasern nach dem Viskoseverfahren, 1967) and the Modal process (see e.g. Austrian patent AT 287905).

EP 0717131 B1 describes the production of viscose fibers from used textiles, which have been dyed by means of reactive dyes. The used textiles described were mechanically disintegrated prior to the Viscose process; however, no chemical treatment of the raw material is mentioned. Reductive bleaching of the alkali cellulose is mentioned for color removal. The cotton waste material from which the cotton fibers may be reclaimed is restricted to post-consumer textiles, being dyed by means of reactive dyes. Similar to what was described above for the direct reuse of colored cotton cuttings. Viscose fiber production according to EP 0717131 B1 requires thorough sorting of the raw materials with respect to their color. No information is given with respect to the quality of the obtained Viscose fibers.

Patent application CN 102660791A also describes the reuse of post-consumer cotton garments via the Viscose process to produce floor mats. No information is given regarding quality of the raw material or the obtained Viscose fibers. However, the restriction to the use of such fibers in the rather low value product floor mats indicates that the quality of these fibers is low and not suitable for textile manufacturing.

U.S. Pat. No. 5,601,767 describes the production of Lyocell fibers by the Lyocell process from shredded cellulose containing fabrics. From the examples given, it becomes obvious that the fabrics used for fiber production were of the post-consumer type. Except from mechanical treatments; no other kind of pretreatment was reported, especially no chemical processing step is mentioned. This implies that fibers produced according to U.S. Pat. No. 5,601,767 are again of limited usability in textile production since colored raw materials will result in colored fibers. In addition, U.S. Pat. No. 5,601,767 contains no possibility for adjusting the cotton cellulose degree of polymerization.

Patent CN 102199310B describes a process for recovering the cotton from waste polyester and cotton textile blends by physically dissolving the cellulosic content in NMMO and subsequent physical separation (filtration) of the undissolved polyester material. It is not mentioned what cellulose concentration is achieved in the prepared solution. Although the as described process of dissolving cellulose in NMMO is closely related to the Lyocell process with even similar stabilizers being used, the production of regenerated cellulosic fibers from this solution is not mentioned. Therefore this process must be solely considered as an option for the separation of cotton from polyester but not suitable for recycling cotton waste material to produce regenerated cellulosic fibers.

None of the previously described recycling options include any chemical pretreatment processes of the reclaimed cotton fibers before being used in the Viscose or Lyocell process.

The above mentioned examples describing the state of the art for using reclaimed cotton fibers to produce regenerated cellulosic materials indicate that all processes of the prior art are dedicated to the recycling of post-consumer cotton waste material.

The use of pre-consumer cotton waste material was not described in detail yet.

In general, pre-consumer cotton waste material or cotton fibers being used for textile production are not considered to be an appropriate material for neither the Viscose nor the Lyocell process. They consist of cellulose molecules with a high degree of polymerisation (DP), i.e. having a high viscosity, usually expressed by the intrinsic viscosity ("IV"). This makes them less accessible to reactants and solvents used for dissolving cellulose and as a result impractical to be treated in the conventional Viscose or Lyocell process.

During the lifetime of a piece of cotton textile the cellulose molecules degrade and their DP is reduced to such a level that cotton fibers from post-consumer textile waste finally may be used as starting materials to produce regenerated cellulosic fibers. However, this is cannot be considered a universally valid fact, as said degradation strongly depends on the conditions and time of use. Therefore a suitable and homogeneous DP level which is required for the production of regenerated cellulosic fibers cannot be assured to be generally present in post-consumer waste, instead, post-consumer waste may be degraded such that the DP level is actually too low for the production of high quality regenerated cellulosic fibers. In pre-consumer waste the high DP is retained.

Moreover, the usability of reclaimed cotton waste material is limited due to the fact that textiles, besides cellulose, typically contain additional chemicals such as dyes, resins, optical brighteners etc. and may further become contaminated during their lifetime by e.g. softeners or bleaching agents during, washing. Also significant amounts of metals can be fund in both pre- and post-consumer cotton waste materials. These metals on the one hand may originate from abrasions of buttons or zips or on the other hand be already incorporated the cotton fibers during growth or while processing cotton fibers into textiles.

The presence of any of these chemicals potentially hinders the application of the reclaimed cotton fibers from cotton waste materials in the Viscose or Lyocell process. As an example, resins chemically interconnect cellulose molecules making them insoluble and unreactive. These substances are not removed from the reclaimed fibers by simple mechanical disintegration steps of the cotton waste materials.

Special attention has to be paid to the metal content of reclaimed cotton fibers, especially with respect to their use as a possible raw material for the Lyocell process. It is known that e.g. iron and copper cations lower the decomposition temperature of NMMO, the solvent in the Lyocell process. Simultaneously the decomposition rate is increased. Accordingly, metals may also catalyze the decomposition of cellulose-containing spinning dopes in both the Viscose and Lyocell process. At elevated process temperatures or elongated processing times this may result in fires and explosions due to uncontrolled decomposition processes. A method for measuring said decomposition temperature is given in EP 0781356 B1 ("Sikarex test").

High contents of Si, Ca, or Mg are typically related to a high amount of particulate impurities likely originating from sand or dust. However, high particle contents in the spinning dopes require higher filtration efforts resulting in lower production. If the particle content is too high, the filtration system may even become completely blocked. Additionally, large amounts of small particles that cannot be removed from the spinning dope by filtration can cause problems at the spinnerets, leading again to lower production and/or lower quality fibers.

Problem:

In view of this state of the art the problem to be solved was to provide a process which allows the use of different qualities of cotton waste materials for the production of molded bodies from regenerated cellulose, thereby providing a pathway for efficient recycling of said cotton waste materials into high quality produces suitable for e.g. textile and nonwoven manufacturing.

Solution:

This problem was solved by a process for pretreating reclaimed cotton fibers to be used in the production of molded bodies from regenerated cellulose, wherein the pretreatment of the reclaimed cotton fibers includes a metal removing stage and an oxidative bleaching stage.

The current invention demonstrates a process of how cotton waste materials of any kind mentioned above may be chemically pretreated to be used in the production of molded bodies from regenerated cellulose by the Viscose or Lyocell process afterwards. Thereby, the current invention provides an elegant recycling option for cotton waste material, avoiding inadequate disposal pathways such as landfill or incineration. The molded bodies produced from cotton waste material pretreated according to the current invention, are of similar or even superior quality compared to molded bodies prepared from commercially available "virgin" dissolving pulp, thus suitable for textile and nonwoven nanofacturing.

Cotton waste materials may be transferred into raw materials suitable for the production of regenerated cellulosic fibers via the Viscose or the Lyocell process; for the purposes of this invention the term "Viscose process" shall include Modal processes which are also based on the formation, spinning and regeneration of cellulose xanthogenate.

The pretreatment process described in the current invention may be applied to pre- and post consumer cotton waste material and/or cotton rag pulps produced thereof. Therefore in a preferred embodiment of the present invention the cotton fibers are reclaimed from pre-consumer cotton waste, such as, but not limited to combing waste, cotton cuttings or waste fibers from garment manufacturing and the like, in another preferred embodiment of the present invention the cotton fibers are reclaimed from post-consumer cotton waste. The term "post-consumer cotton waste" includes, but is not limited to laundry waste or used clothes. In a particularly preferred embodiment the reclaimed cotton fibers include pulp prepared from cotton rags.

Before applying chemical treatments according to the present invention it may be useful to apply mechanical treatments to prepare the reclaimed fibers adequately. This can be done by a stage wherein the reclaimed cotton fibers are mechanically shredded, milled, or opened prior to their use. Also useful depending e.g. on the origin of the fibers—may be a mechanical stage wherein the reclaimed cotton fibers are separated from buttons or zips or the like prior to their use. Also useful may be a mechanical or chemical stage wherein the reclaimed cotton fibers are separated from non-cotton fibers prior to their use.

The described process is a multistage process wherein oxidative bleaching treatments are combined with acidic washing treatments and/or treatment with aqueous solutions of complexing agents. By adjusting the combination and/or intensity of the single steps, the described process may be used to treat any kind of cotton waste material in such a way that the reclaimed cotton fibrous material may be used as a raw material for the production of regenerated cellulose molded bodies. Especially, the described process effectively lowers the metal content and allows for adjustment of the viscosity and brightness of the reclaimed cotton fibers.

By pretreating cotton waste materials according to the current invention, technically safe and economically feasible fiber spinning is ensured.

Therefore in a preferred embodiment of the process according the invention the metal removing stage is an acidic washing treatment and/or a treatment with a complexing agent.

According to the current invention cotton waste material is subjected to an acidic washing treatment to effectively lower the metal content. This is especially important if the reclaimed fibrous material is intended to be used in the Lyocell process, but also applies for the Viscose process.

The acidic washing treatment according to the current invention may be performed at pH-values between 1.5 and 5, preferably between 2 and 3 at temperatures between room temperature to 100° C., preferably between 50 to 70° C. for 15 to 120 min, preferably 15 to 60 min. In a preferred embodiment the acidic washing treatment is performed in a way that the degree of polymerization of the cellulose within the cotton waste material is not altered by more than 10%, preferably less than 5% with respect to the initial value.

Metal removal according to the current invention may also be performed by treating the cotton waste material by an aqueous solution of a complexing agent. Preferably, the concentration of the complexing agent in said aqueous solution is lower than 5 kg per ton of oven dried pulp (odtp), and especially preferred below 2 kg/odtp. The treatment of the cotton waste material with an aqueous solution of a complexing agent may be conducted at temperatures between room temperature to 100° C., preferably between 50 to 80° C. for 15 to 120 min, preferably 15 to 90 min.

The acidic washing step and the treatment with an aqueous solution of a complexing agent may be combined in one process step, by adding the complexing agent to the acidic washing liquor.

After successful metal removal according to the above described treatments a treated sample passes the Sikarex test as described in EP 0781356 B1.

To ensure that spinning dopes suitable for the use in the Viscose or Lyocell process can be prepared from the reclaimed cotton fibers the cellulose degree of polymerisation or equivalently their viscosity, usually expressed by the intrinsic viscosity ("IV"), has to be adjusted to a certain range. According to the current invention, viscosity adjustment may be performed by oxidative bleaching treatments of the reclaimed cotton fibers. Oxidative bleaching may be conducted free from elementary chlorine ("ECF"), using e.g. Hypochlorides or $ClO_2$, or total chlorine free ("TCF").

A preferred embodiment of the current invention of performing an oxidative bleaching treatment is bleaching of the reclaimed cotton fibers with peroxide, typically referred to as P-stage by a person skilled in the art. Peroxide bleaching according, to the current invention may be performed at a pH of 8 to 12, preferably between 10 and 11, at temperatures between 50 to 100° C., preferably between 70 to 80° C. for a reaction time of 10 to 120 min, preferably 30 to 60 min. The peroxide dose may be varied between 2 to 40 kg $H_2O_2$ per odtp, preferably between 5 to 15 kg $H_2O_2$/odtp. A stabilizing agent such as complexing agents, silicates, polyphosphates or Mg-salts may be added to the P-stage. Other peroxides like peracetic acid, Caro's acid or the like are applicable, as well.

In another preferred embodiment of the current invention performing an oxidative bleaching treatment is bleaching of the reclaimed cotton fibers with oxygen, typically referred to as O-stage by a person skilled in the art.

Oxygen bleaching, according to the current invention may be performed at a pH of 8 to 12, preferably between 10 and 11, at temperatures between 50 to 120° C., preferably between 80 to 100° C. for a reaction time of 15 to 240 min. preferably 60 to 90 min.

The relative oxygen pressure during the O-stage may be 1 to 10 bar, preferably 3 to 6 bar.

Another preferred embodiment of the current invention of performing an oxidative bleaching treatment is bleaching of the reclaimed cotton fibers with ozone, typically referred to as Z-stage by a person skilled in the art.

Ozone bleaching according to the current invention may be performed at a pH of 2 to 5, preferably between 2 and 3, at temperatures between 30 to 90° C., preferably between 40 to 60° C. for a reaction time of 1 to 120 s, preferably 1 to 10 s.

The ozone dose may varied between 0.1 to 6 kg $O_3$/odtp, preferably between 1 to 3 kg $O_3$/odtp.

Depending on the initial intrinsic viscosity of the cotton waste material the conditions of said oxidative bleaching treatments may be varied to adjust the final IV of the reclaimed cotton fibers.

If the reclaimed cotton fibers are intended to be used in the production of molded bodies from regenerated cellulose according to the Viscose process, the IV of said reclaimed cotton fibers should be adjusted in the range between 850 to 300 ml/g, preferably between 650 to 350 ml/g, most preferred between 550 to 400 ml/g.

If the reclaimed cotton fibers are intended to be used in the production of molded bodies from regenerated cellulose according to the Lyocell process, the IV of said reclaimed cotton fibers should be adjusted in the range between 650 to 300 ml/g, preferably between 500 to 350 ml/g, most preferred between 440 to 360 ml/g.

According to the current invention, it is also possible to combine said oxidative bleaching treatments to achieve the desired IV levels with respect to the Viscose or Lyocell process.

In a preferred embodiment of the current invention, oxidative bleaching treatments are performed subsequently to treating the reclaimed cotton fibers by acidic washing or treating them with an aqueous solution of a complexing agent or after a combination of both of them.

An overview of the possible process embodiments is given in FIG. 1.

The current invention additionally enables the use of colored cotton waste materials as source for reclaiming cotton fibers. By treating said colored cotton waste material by the described process dyestuff may be removed by washing out during the acidic washing treatment and/or by destroying the chromophores during the oxidative bleaching treatments. Therefore the brightness of the reclaimed cotton fibrous material may be adjusted to the desired level by oxidative bleaching. Preferably the brightness is adjusted to >80% ISO by an oxidative bleaching stage according to the current invention.

Another part of the present invention is the use of the reclaimed cotton fibers obtained by, the process as described above in the production of a molded body from regenerated cellulose according to the Viscose process.

The molded body thus obtained may be a staple fiber, filament fiber, sponge or foil of the Viscose or Modal type.

Another preferred embodiment of the present invention is the use of the reclaimed cotton fibers obtained by the process as described above in the production of a molded body from regenerated cellulose according to the Lyocell process.

The molded body thus obtained may be a staple fiber, filament fiber, sponge or foil of the Lyocell type.

The reclaimed cellulosic fibers can be used in the production of such molded bodies from regenerated cellulose either purely or in blends with commercially available dissolving pulp and the resulting molded bodies can be used for further processing into textile or nonwoven products.

Advantages when using the described process:

Pretreating pre or post-consumer cotton waste material or cotton rag pulp produced thereof according to the current invention offers several advantages in the production of molded bodies from regenerated cellulose by the Viscose or Lyocell process when compared to untreated cotton waste material.

It is an advantage of the current invention that by the described process the total metals content of the reclaimed cotton fibers is lowered to an extend that enables the preparation of thermally stable spinning dopes.

It is another advantage of the current invention that by the described process the overall metals content of the reclaimed cotton fibers is effectively reduced. Less particles in the spinning dopes (both Viscose and Lyocell) leads to better processability.

It is another advantage of the current invention that by the described process the intrinsic viscosity of the reclaimed cotton fibers can be adjusted in a broad range. Therefore, the current invention allows that any kind of pre- or post-consumer cotton waste material or cotton rag pulp produced thereof may be used for the manufacturing of molded bodies from regenerated cellulose via the Viscose or Lyocell process.

It is another advantage of the current invention that by subjecting the reclaimed cotton fibers to the described process their brightness can be adjusted in a broad range. Therefore, the current invention allows that cotton fibers reclaimed from cotton waste materials of various different initial colors may be used for the manufacturing of molded bodies from regenerated cellulose.

It is still another advantage of the current invention that by subjecting reclaimed cotton fibers to the described process the production molded bodies from regenerated cellulose via the Viscose or Lyocell process having the similar or even superior properties as compared to such prepared from conventional dissolving pulp is possible.

Last but not least it is another advantage of the current invention that reclaimed cellulosic fibers obtained by the described process may be used either alone or m blends with commercially available dissolving pulp.

EXAMPLES

Example 1

A Lyocell spinning; dope was prepared from Sample 1 being untreated reclaimed cotton fibers from colored pre-consumer cotton waste material present in the form of cotton rag pulp. Said spinning dope was subjected to the Sikarex test without any pretreatment. Said spinning dope did not pass the Sikarex Test.

Example 2

Another Lyocell spinning dope was prepared from Sample 2 being untreated reclaimed cotton fibers from indigo dyed pre-consumer Denim waste material. Due to the high viscosity of the reclaimed fibers a fibrous cellulose NMMO mixture was obtained, not suitable as spinning dope. Said fibrous cellulose NMMO mixture was subjected to the Sikarex test. Said mixture did not pass the Sikarex Test.

Example 3

Sample 3 being reclaimed cotton fibers from colored pre-consumer cotton waste material present in the form of cotton rag pulp was subjected to an acidic washing treatment according to the current invention. Acidic washing was performed at pH 3 at a temperature of 60° C. for 15 min. The sample was dewatered and washed with deionised water. Sample 3 was then subjected to oxidative bleaching by hydrogen peroxide according to the current invention. Hydrogen peroxide bleaching was performed at pH 10.6 for 60 min at 80° C. The dose of $H_2O_2$ was 10 kg/odtp. 1 kg $Mg^2$/odtp was added in the form of $Mg(SO_4)$ as bleaching auxiliary. Finally, the sample was dewatered, washed with deionised water and air dried.

After subjecting sample 3 to said treatments the sample is referred to as sample 3 A-P. The metals content was effectively lowered such that spinning dopes prepared from sample 3 A-P successfully passed the Sikarex test. The intrinsic viscosity of sample 3 A-P was adjusted to 390 ml/g and the brightness was increased to 85.7% ISO.

(1) A Lyocell spinning dope was prepared from a mixture of 10% Sample 3 A-P and 90% conventional dissolving pulp. Said spinning dope was used to produce regenerated cellulosic fibers of the Lyocell type by treating them according to the Lyocell process, as generally known to a person skilled in the art e.g. from EP 0356419 B1 and EP 0671492 B1. Corresponding fiber data are presented in Table 1.

Example 4

Sample 3 was subjected to an acidic washing treatment according to the current invention as described in Example 3. Sample 3 was then subjected to oxidative bleaching by ozone according to the current invention. Ozone bleaching was performed at pH 2.5 for a reaction time of 10 s at 50° C. The dose of $O_3$ was 2.9 kg/odtp. Finally, the sample was dewatered, washed with deionised water and air dried.

After subjecting sample 3 to said treatments the sample is referred to as sample 3 A-Z. The metals content was effectively lowered such that spinning dopes prepared from sample 3 A-Z successfully passed the Sikarex test. The intrinsic viscosity of sample 3 A-Z was adjusted to 371 ml/g and the brightness was increased to 82.4% ISO.

Example 5

Sample 4 being reclaimed cotton fibers from colored pre-consumer cotton waste material present in the form of cotton rag pulp was subjected to oxidative bleaching by hydrogen peroxide according to the current invention. Sample 4 was then subjected to an acidic washing treatment according to the current invention. Finally, the sample was dewatered, washed with deionised water and air dried.

After subjecting sample 4 to said treatments the sample is referred to as sample 4 P-A. The metals content was effectively lowered such that spinning dopes prepared from sample 4 P-A successfully passed the Sikarex test. The intrinsic viscosity of sample 4 P-A was adjusted to 372 ml/g and the brightness was increased to 82.1% ISO.

(1) A Lyocell spinning dope was prepared from 100% Sample 4 P-A. Said spinning dope was used to produce regenerated cellulosic fibers of the Lyocell type by treating them according to the Lyocell process. Corresponding fiber data are presented in Table 1.
(2) A Viscose spinning dope was prepared from 100% Sample 4 P-A. Said spinning dope was used to produce regenerated cellulosic fibers of the Viscose type by treating them according to the Viscose process, as generally known to a person skilled in the art, e.g. from Götze, "Chemiefasern nach dem Viskoseverfahren", 1967. Corresponding fiber data are presented in Table 1.
(3) A Viscose spinning dope was prepared from a mixture of 20% Sample 4 P-A and 80% conventional dissolving pulp. Said spinning dope was used to produce regenerated cellulosic fibers of the Viscose type by treating them according to the Viscose process. Corresponding fiber data are presented in Table 1.

Example 6

Sample 4 after being bleached by hydrogen peroxide was subjected to an acidic washing treatment simultaneously adding a complexing agent in low concentration according to the current invention. The treatment was performed at pH 3 at a temperature of 60° C. for 30 min, EDTA was added as said complexing agent, the concentration was 2 kg/odtp. Finally, the sample was dewatered, washed with deionised water and air dried.

After subjecting sample 4 to said treatments the sample is referred to as sample 4 P-AQ. The metals content was effectively lowered such that spinning dopes prepared from sample 4 P-A successfully passed the Sikarex test. The intrinsic viscosity of sample 4 P-AQ was adjusted to 366 ml/g and the brightness was increased to 84.5% ISO.

Example 7

Sample 5 being reclaimed cotton fibers from colored pre-consumer cotton waste material present in the form of cotton rag pulp was subjected to oxidative bleaching by hydrogen peroxide according to the current invention. Sample 5 was then subjected to an acidic washing treatment according to the current invention. Finally, the sample was &watered, washed with deionised water and air dried.

After subjecting sample 5 to said treatments the sample is referred to as sample 5 P-A. The metals content was effectively lowered such that spinning dopes prepared from sample 5 P-A successfully passed the Sikarex test. The intrinsic viscosity of sample 5 P-A was adjusted to 612 ml/g and the brightness was increased to 80.9% ISO.

(1) A Viscose spinning dope was prepared from 100% Sample 5 P-A. Said spinning dope was used to produce regenerated cellulosic fibers of the Modal type by treating them according to the Modal process, as generally known to a person skilled in the art, e.g. from AT 287905. Corresponding fiber data are presented in Table 1.

Example 8

Sample 6 being untreated reclaimed cotton fibers from indigo dyed pre-consumer Denim waste material was subjected to alkaline cooking similar to CRP production. Subsequently sample 6 was subjected to an acidic washing treatment according to the current invention. Then sample 6 was subjected to an oxidative bleaching sequence according to the current invention. The bleaching sequence consisted of a Z-stage followed by a P-stage. The Z-stage was performed at pH 2.5 for a reaction time of 10 s at 50° C. The dose of $O_3$ was 5.2 kg/odtp. The P-stage bleaching was performed at pH 10.5 for 30 min at 80° C. The dose of $H_2O_2$ was 10 kg/odtp. 1 kg $Mg^{2+}$/odtp was added in the form of $Mg(SO_4)$ as bleaching auxiliary. Finally, the sample was dewatered, washed with deionised water and air dried.

After subjecting sample 6 to said treatments the sample is referred to as sample 6 A-Z-P. The metals content was effectively lowered such that spinning dopes prepared from sample 6 A-Z-P successfully passed the Sikarex test. The intrinsic viscosity of sample 6 A-Z-P was adjusted to 498 ml/g and the brightness was increased to 90.3% ISO.

TABLE 1

Fiber data

| Sample for spinning dope | % reclaimed cotton fibers | % standard dissolving pulp | Fiber type | Titer [dtex] | FFk [cN/tex] | FDk [%] |
|---|---|---|---|---|---|---|
| Reference | 0 | 100 | Viscose | 1.3 | 27.3 | 17.7 |
| Sample 4 P-A | 100 | 0 | Viscose | 1.3 | 27.6 | 18.1 |
| Sample 4 P-A | 20 | 80 | Viscose | 1.3 | 27.2 | 17.5 |
| Reference | 0 | 100 | Lyocell | 1.3 | 41.4 | 10.4 |
| Sample 4 P-A | 100 | 0 | Lyocell | 1.3 | 43.0 | 9.5 |
| Sample 3 A-P | 10 | 90 | Lyocell | 1.3 | 35.7 | 10.5 |
| Reference | 0 | 100 | Modal | 1.3 | 26.5 | 14.1 |
| Sample 5a | 100 | 0 | Modal | 1.3 | 30.4 | 14.3 |

What is claimed is:

1. A process for obtaining a molded cellulose body comprising:
    pretreating reclaimed cotton fibers in a chemical metal removing stage and an oxidative bleaching stage;
    preparing a spinning dope comprising the reclaimed cotton fibers by a lyocell or viscose process to produce a regenerated cellulose; and
    obtaining the molded cellulose body.

2. The process according to claim 1, wherein the cotton fibers are reclaimed from pre-consumer cotton waste.

3. The process according to claim 1, wherein the cotton fibers are reclaimed from post-consumer cotton waste.

4. The process according to claim 1, wherein the reclaimed cotton fibers include pulp prepared from cotton rags.

5. The process according to claim 1, wherein the reclaimed cotton fibers are mechanically shredded, milled, or opened prior to their use.

6. The process according to claim 1, wherein the chemical metal removing stage is an acidic washing treatment and/or a treatment with a complexing agent.

7. The process according to claim 6, wherein the reclaimed cotton fibers are treated by an aqueous solution of a complexing agent.

8. The process according to claim 6, wherein both treatments are combined in one step by adding a complexing agent to the acidic washing treatment.

9. The process according to claim 1, wherein the oxidative bleaching stage comprises an oxygen bleaching treatment.

10. The process according to claim 1, wherein the oxidative bleaching stage comprises a peroxide bleaching treatment.

11. The process according to claim 1, wherein the oxidative bleaching stage comprises an ozone bleaching treatment.

12. The process according to claim 1, wherein the oxidative bleaching stage comprises a sequence of oxidative bleaching treatments selected from the group consisting of oxygen bleaching treatment, peroxide bleaching treatment and ozone bleaching treatment.

13. The process according to claim 1, wherein the molded cellulose body is produced according to the Viscose process.

14. The process according to claim 13, wherein the process conditions are chosen such that an intrinsic viscosity of the reclaimed cotton fibers after pretreating is in the range between 850 to 300 ml/g.

15. The process according to claim 14, wherein the intrinsic is in the range between 650 to 350 ml/g.

16. The process according to claim 15, wherein the intrinsic viscosity is in the range between 550 to 400 ml/g.

17. The process according to claim 13, wherein the molded body is a staple fiber, filament fiber, sponge or foil of the Viscose or Modal type.

18. The process according to claim 13, wherein the viscose process is a Modal process.

19. The process according to claim 1 wherein the molded cellulose body is produced according to the Lyocell process.

20. The process according to claim 19, wherein the process conditions are chosen such that an intrinsic viscosity of the reclaimed cotton fibers after pretreating is in the range between 650 to 300 ml/g.

21. The process according to claim 20, wherein the intrinsic viscosity is in the range between 500 to 350 ml/g.

22. The process according to claim 21, wherein the intrinsic viscosity is in the range between 440 to 360 ml/g.

23. The process according to claim 19, wherein the molded body is a staple fiber, filament fiber, sponge or foil of the Lyocell type.

24. The process according to claim 1, wherein the spinning dope further comprises dissolving pulp.

25. The process according to claim 1, wherein the resulting molded bodies are used for further processing into textile or nonwoven products.

26. The process according to claim 1, wherein the spinning dope comprises 100% reclaimed cotton fibers.

* * * * *